United States Patent
Lee et al.

(10) Patent No.: US 11,432,226 B2
(45) Date of Patent: Aug. 30, 2022

(54) METHOD FOR FORWARDING SYSTEM INFORMATION FOR A REMOTE UE BY A RELAY UE IN WIRELESS COMMUNICATION SYSTEM AND A DEVICE THEREFOR

(71) Applicant: LG Electronics Inc., Seoul (KR)

(72) Inventors: Jaewook Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 16/500,252

(22) PCT Filed: Apr. 19, 2018

(86) PCT No.: PCT/KR2018/004551
§ 371 (c)(1),
(2) Date: Oct. 2, 2019

(87) PCT Pub. No.: WO2018/194390
PCT Pub. Date: Oct. 25, 2018

(65) Prior Publication Data
US 2021/0120476 A1    Apr. 22, 2021

Related U.S. Application Data

(60) Provisional application No. 62/487,526, filed on Apr. 20, 2017.

(51) Int. Cl.
*H04W 40/22* (2009.01)
*H04W 48/10* (2009.01)
*H04W 88/04* (2009.01)

(52) U.S. Cl.
CPC ........... *H04W 40/22* (2013.01); *H04W 48/10* (2013.01); *H04W 88/04* (2013.01)

(58) Field of Classification Search
CPC ...... H04W 40/22; H04W 48/10; H04W 88/04
See application file for complete search history.

(56) References Cited

U.S. PATENT DOCUMENTS 9,913,242 B1 *   3/2018   Saleh ..................... H04B 7/14
9,949,246 B2 *   4/2018   Li ........................ H04W 76/14
(Continued)

FOREIGN PATENT DOCUMENTS

| WO | 2016186387 A1 | 11/2016 |
| WO | 2017026872 A1 | 2/2017 |
| WO | 2017052335 A1 | 3/2017 |

*Primary Examiner* — Brenda H Pham
(74) *Attorney, Agent, or Firm* — Dentons US LLP

(57) ABSTRACT

The present invention relates to a wireless communication system. More specifically, the present invention relates to a method and a device for forwarding system information for a remote UE by a relay UE in wireless communication system, the method comprising: establishing a link between a remote UE and the relay UE for communicating between the remote UE and the network via the relay UE; receiving assistance information including a serving cell identity of the remote UE from the remote UE; checking whether a serving cell identity of the relay UE and the serving cell identity of the remote UE are same or not; and forwarding system information block (SIB), which was already received by the relay UE from the network, to the remote UE via the link if the serving cell identity of the relay UE and the serving cell identity of the remote UE are different. The UE is capable of communicating with at least one of another UE, a UE related to an autonomous driving vehicle, a base station or a network.

3 Claims, 17 Drawing Sheets

(56) References Cited

U.S. PATENT DOCUMENTS

| | | | |
|---|---|---|---|
| 9,974,066 B2* | 5/2018 | Novlan | H04W 56/0015 |
| 10,326,520 B2* | 6/2019 | Ouyang | H04W 88/04 |
| 10,477,380 B2* | 11/2019 | Adachi | H04L 67/16 |
| 2010/0142433 A1* | 6/2010 | Womack | H04W 48/16 |
| | | | 370/315 |
| 2010/0167743 A1* | 7/2010 | Palanki | H04W 72/02 |
| | | | 455/436 |
| 2015/0029866 A1 | 1/2015 | Liao et al. | |
| 2016/0337954 A1* | 11/2016 | Gulati | H04W 76/14 |
| 2017/0086114 A1* | 3/2017 | Jung | H04W 52/46 |
| 2017/0273011 A1* | 9/2017 | Rico Alvarino | H04W 4/70 |
| 2018/0227736 A1* | 8/2018 | Lee | H04W 36/08 |
| 2019/0036595 A1* | 1/2019 | Ohtsuji | H04B 7/15 |
| 2020/0029299 A1* | 1/2020 | Kuang | H04W 48/08 |

\* cited by examiner (a) Control-Plane Protocol Stack (b) User-Plane Protocol Stack

METHOD FOR FORWARDING SYSTEM INFORMATION FOR A REMOTE UE BY A RELAY UE IN WIRELESS COMMUNICATION SYSTEM AND A DEVICE THEREFOR

This application is a National Stage Entry of International Application No. PCT/KR2018/004551 filed Apr. 19, 2018, which claims the benefit of U.S. Provisional Application No. 62/487,526 filed Apr. 20, 2017, all of which are hereby incorporated by reference in their entirety for all purposes as if fully set forth herein.

TECHNICAL FIELD

The present invention relates to a wireless communication system and, more particularly, to a method for forwarding system information for a remote UE by a relay UE in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

If the remote UE and the relay UE may be in different cells, the system information of each cell is different. However, if the remote UE is linked to the relay UE, it is desirable for the remote UE to behave according to the system information of the cell of the relay UE.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, the relay UE receives serving cell identity of the remote UE from the remote UE and forwards the system information if the relay UE determines that the remote UE needs to obtain the system information newly.

Further, if the serving cell identity of the relay UE and the serving cell identity of the remote UE are same, the relay UE does not transmit system information to the remote UE, thus saving battery consumption and improving the efficiency of sidelink communication.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
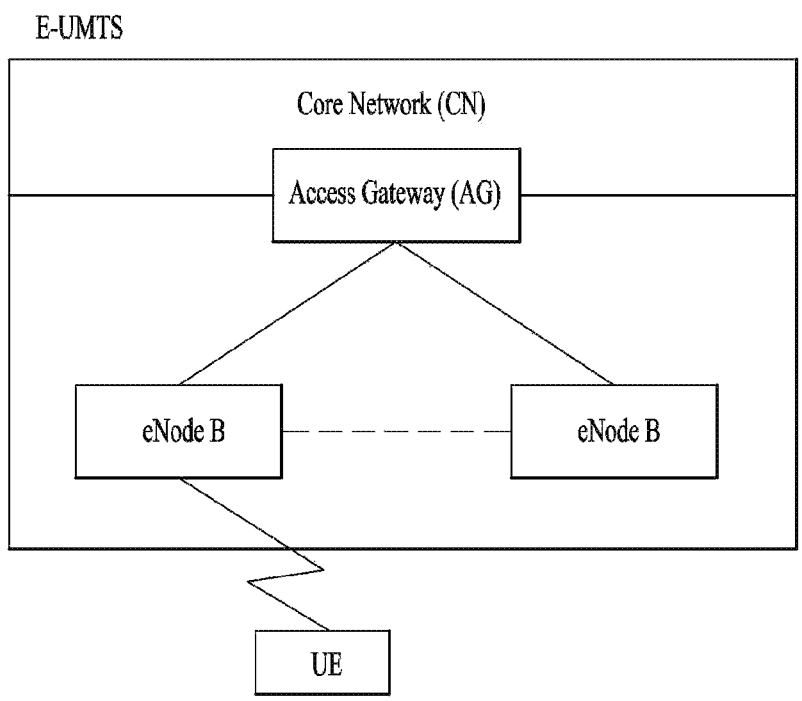
FIG. 1 is a diagram showing a network structure of an Evolved Universal Mobile Telecommunications System (E-UMTS) as an example of a wireless communication system.
Figure 2A:
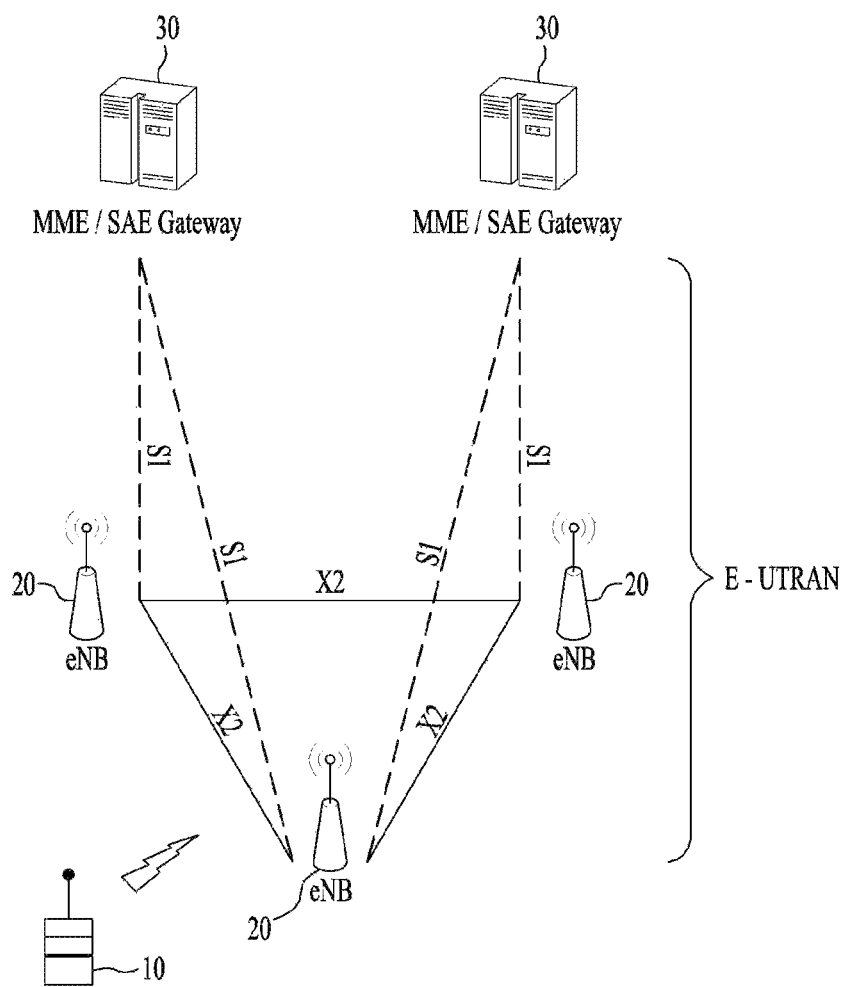
FIG. 2a is a block diagram illustrating network structure of an evolved universal mobile telecommunication system (E-UMTS)

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
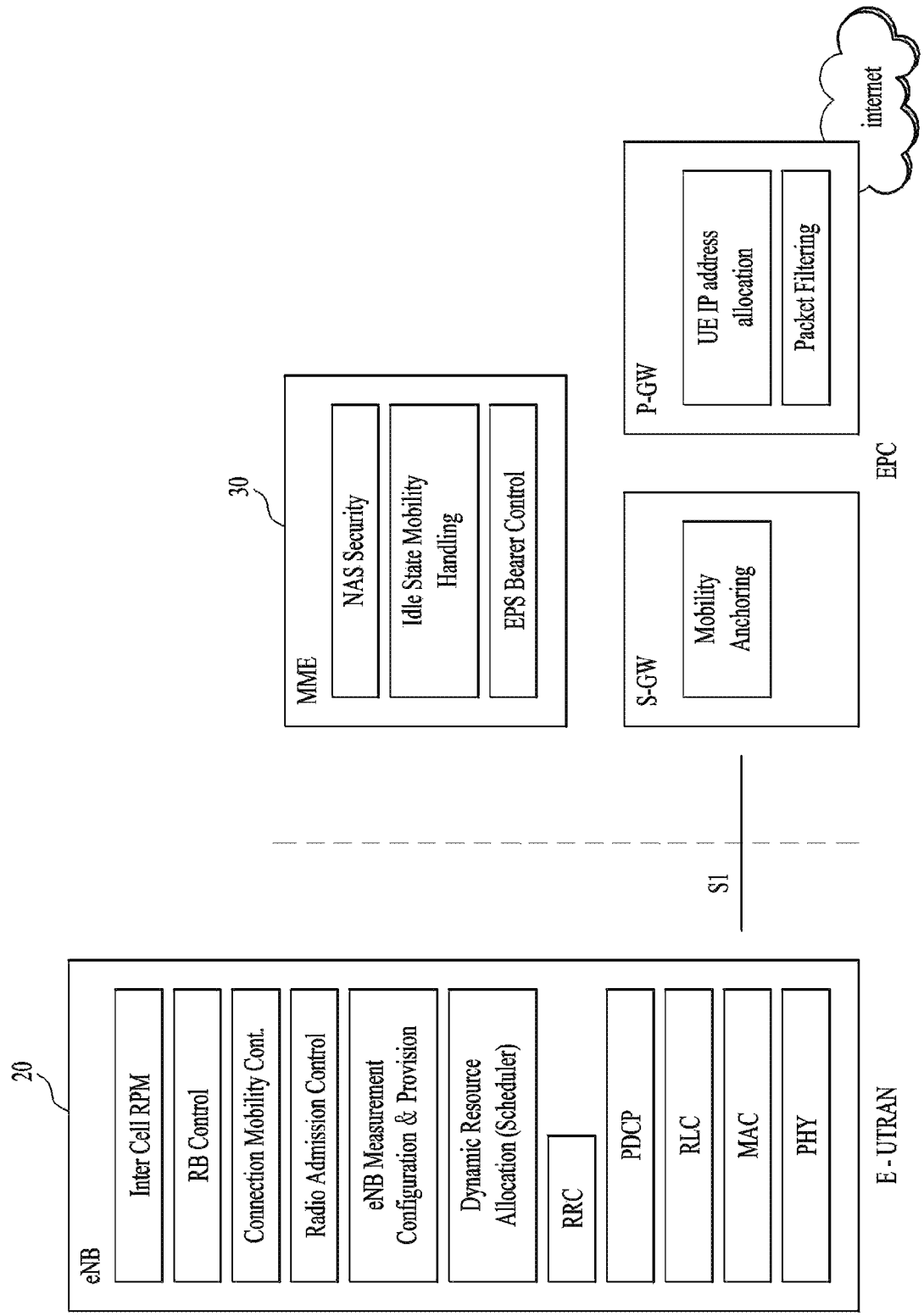
FIG. 2b is a block diagram depicting architecture of a typical E-UTRAN and a typical EPC.

FIG. 2b is a block diagram depicting architecture of a typical E-UTRAN and a typical EPC.

As illustrated in FIG. 2b, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
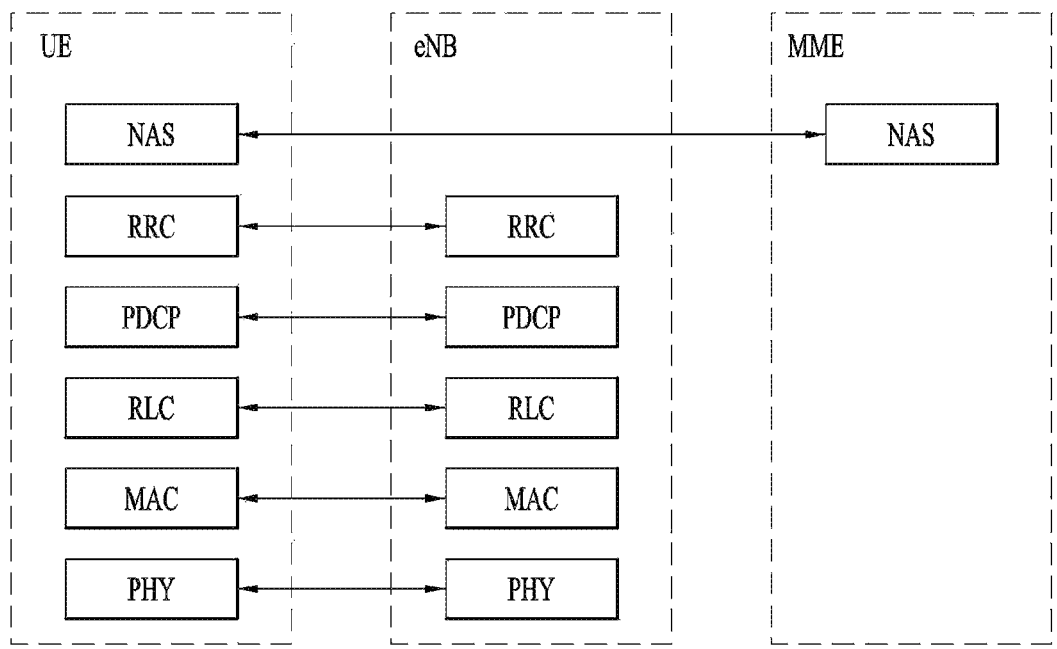
FIG. 3 is a diagram showing a control plane and a user plane of a radio interface protocol between a UE and an E-UTRAN based on a 3rd generation partnership project (3GPP) radio access network standard.
Figure 3:
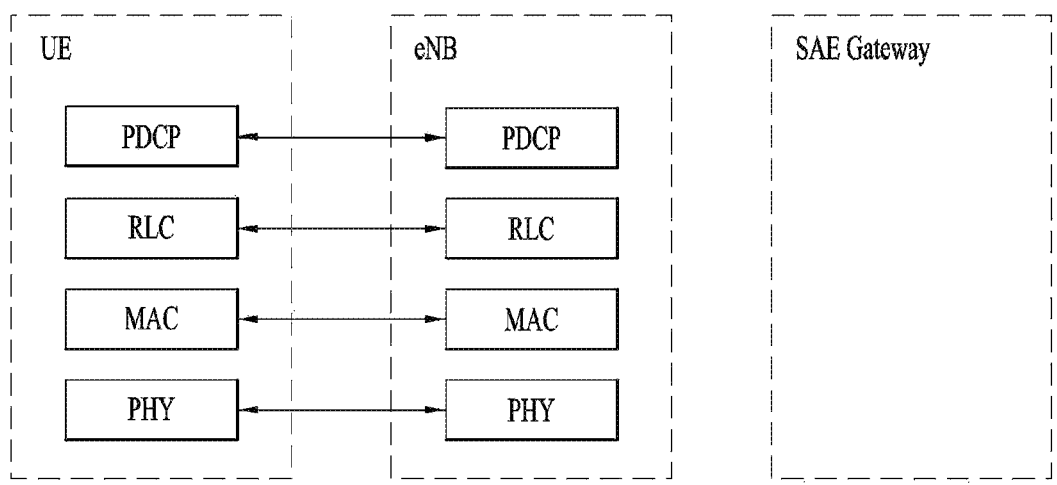

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
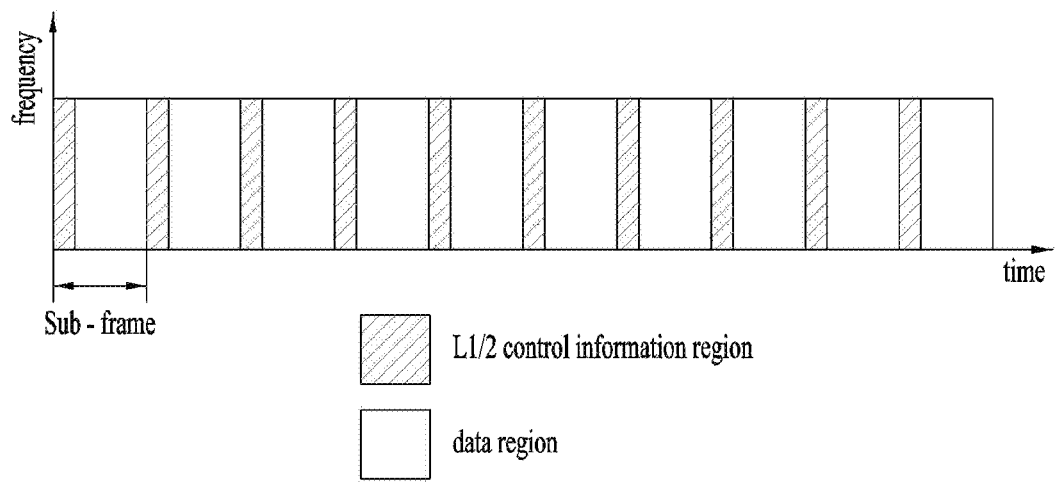
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
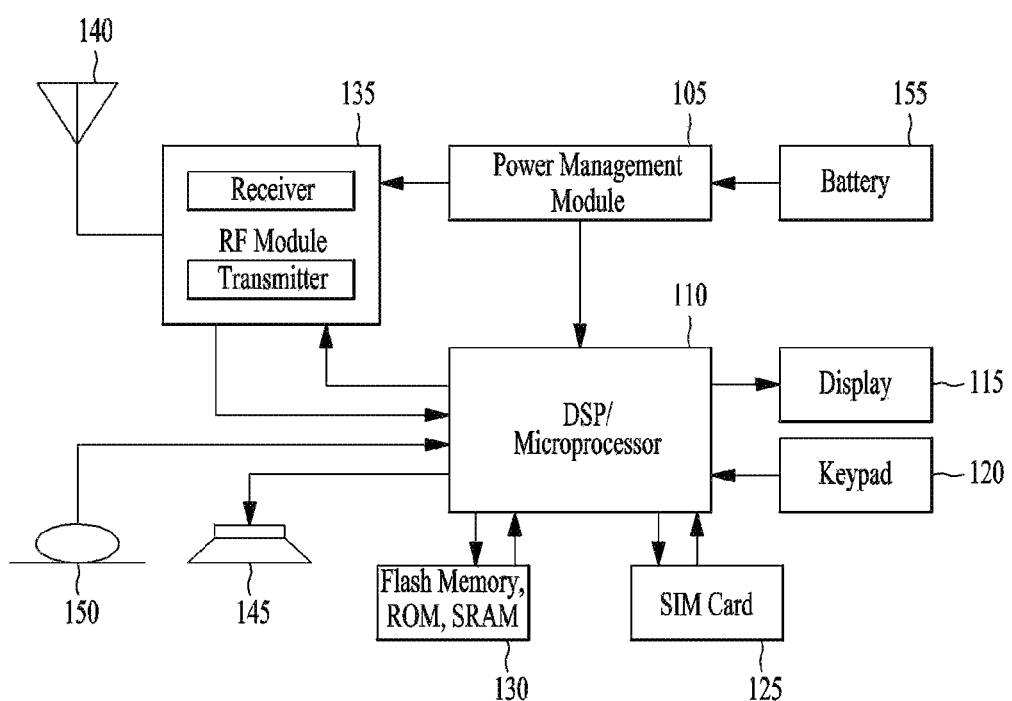
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
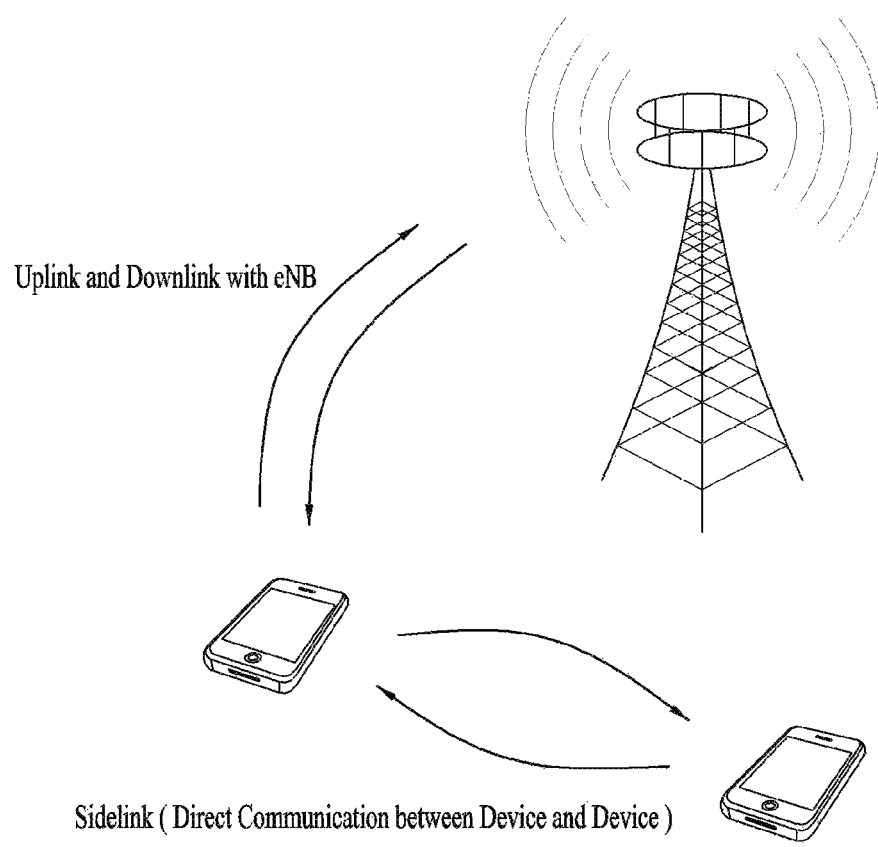
FIG. 6 is a conceptual diagram for sidelink communication.

FIG. 6 is a conceptual diagram for sidelink communication.

Sidelink comprises sidelink discovery, sidelink communication and V2X sidelink communication between UEs. Sidelink uses uplink resources and physical channel structure similar to uplink transmissions. However, some changes, noted below, are made to the physical channels. Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe. For V2X sidelink communication, PSCCH and PSSCH are transmitted in the same subframe. The sidelink physical layer processing of transport channels differs from UL transmission in the following steps: for PSDCH and PSCCH, the scrambling is not UE-specific; and modulation of 64 QAM and 256 QAM is not supported for sidelink. PSCCH is mapped to the sidelink control resources. PSCCH indicates resource and other transmission parameters used by a UE for PSSCH. For PSDCH, PSCCH and PSSCH demodulation, reference signals similar to uplink demodulation reference signals are transmitted in the 4-th symbol of the slot in normal CP and in the 3rd symbol of the slot in extended cyclic prefix. The sidelink demodulation reference signals sequence length equals the size (number of sub-carriers) of the assigned resource. For V2X sidelink communication, reference signals are transmitted in 3rd and 6th symbols of the first slot and 2nd and 5th symbols of the second slot in normal CP. For PSDCH and PSCCH, reference signals are created based on a fixed base sequence, cyclic shift and orthogonal cover code. For V2X sidelink communication, cyclic shift for PSCCH is randomly selected in each transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorised to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronisation signal and SBCCH in one subframe and transmit synchronisation signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order in case Sidelink Discovery Gap is not configured:
 i) Uu transmission/reception (highest priority);
 ii) PC5 sidelink communication transmission/reception;
 iii) PC5 sidelink discovery announcement/monitoring (lowest priority).

The UE performs transmission and reception over Uu and PC5 with the following decreasing priority order in case Sidelink Discovery Gap is configured:
 i) Uu transmission/reception for RACH;
 ii) PC5 sidelink discovery announcement during a Sidelink Discovery Gap for transmission;
 iii) Non-RACH Uu transmission;
 iv) PC5 sidelink discovery monitoring during a Sidelink Discovery Gap for reception;
 v) Non-RACH Uu reception;
 vi) PC5 sidelink communication transmission/reception.

Figure 7A:
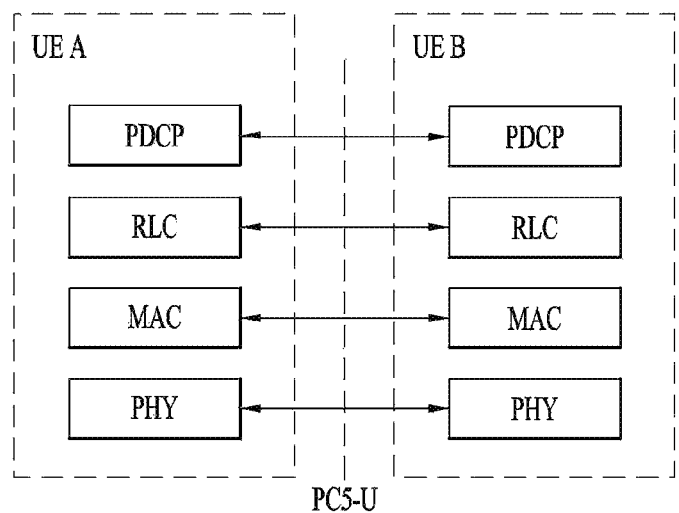
FIG. 7a is a diagram for protocol stack for the user plane of sidelink communication.
Figure 7B:
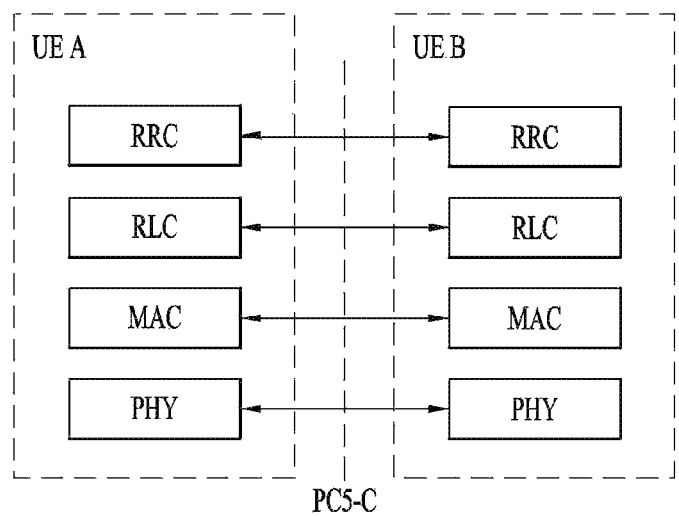
FIGS. 7b and 7c are diagrams for protocol stack for the control plane of sidelink communication.
Figure 7C:
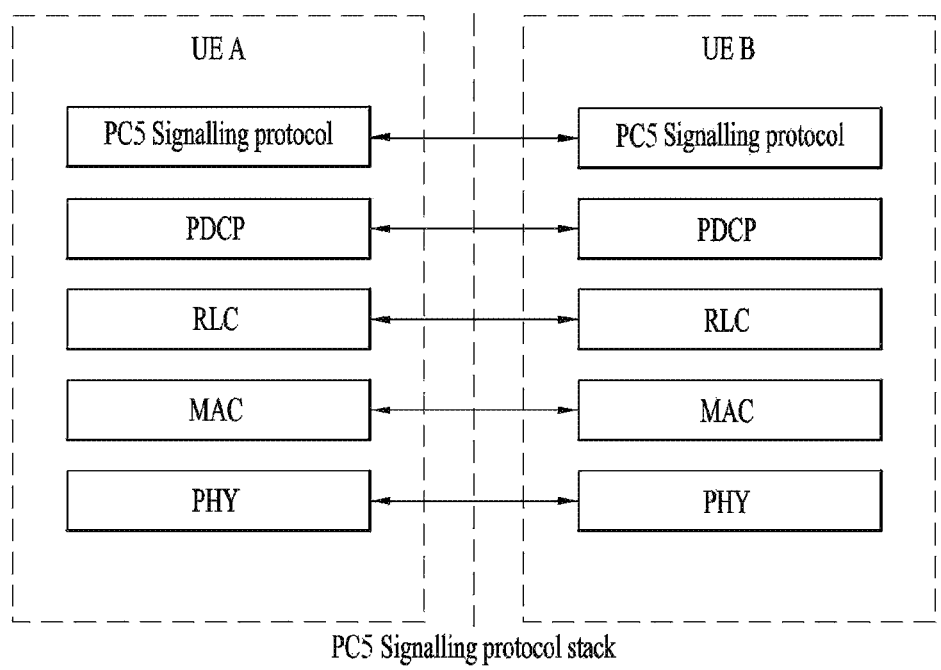

FIG. 7a is a diagram for protocol stack for the user plane of sidelink communication, FIGS. 7b and 7c are diagrams for protocol stack for the control plane of sidelink communication;

FIG. 7a shows the protocol stack for the user plane, where PDCP, RLC and MAC sublayers (terminate at the other UE) perform the functions listed for the user plane. The Access Stratum protocol stack in the PC5 interface consists of PDCP, RLC, MAC and PHY as shown below in FIG. 7a.

User plane details of sidelink communication: i) there is no HARQ feedback for sidelink communication; ii) RLC UM is used for sidelink communication; iii) a receiving UE needs to maintain at least one RLC UM entity per transmitting peer UE; iv) a receiving RLC UM entity used for sidelink communication does not need to be configured prior to reception of the first RLC UMD PDU; v) a ROHC Unidirectional Mode is used for header compression in PDCP for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

A UE does not establish and maintain a logical connection to receiving UEs prior to one-to-many a sidelink communication. Higher layer establishes and maintains a logical connection for one-to-one sidelink communication including ProSe UE-to-Network Relay operation.

The Access Stratum protocol stack for SBCCH (Sidelink Broadcast Control Channel) in the PC5 interface consists of RRC, RLC, MAC and PHY as shown below in FIG. 7b.

The control plane for establishing, maintaining and releasing the logical connection for one-to-one sidelink communication is shown in FIG. 7c.

FIGS. 8a to 8d are examples for radio protocol stacks for Layer-2 evolved UE-to-Network relay.

In FIGS. 8a to 8d, a protocol architecture for supporting Layer 2 evolved UE-to-Network Relay UE is given for the user plane and the control plane.

Figure 8A:
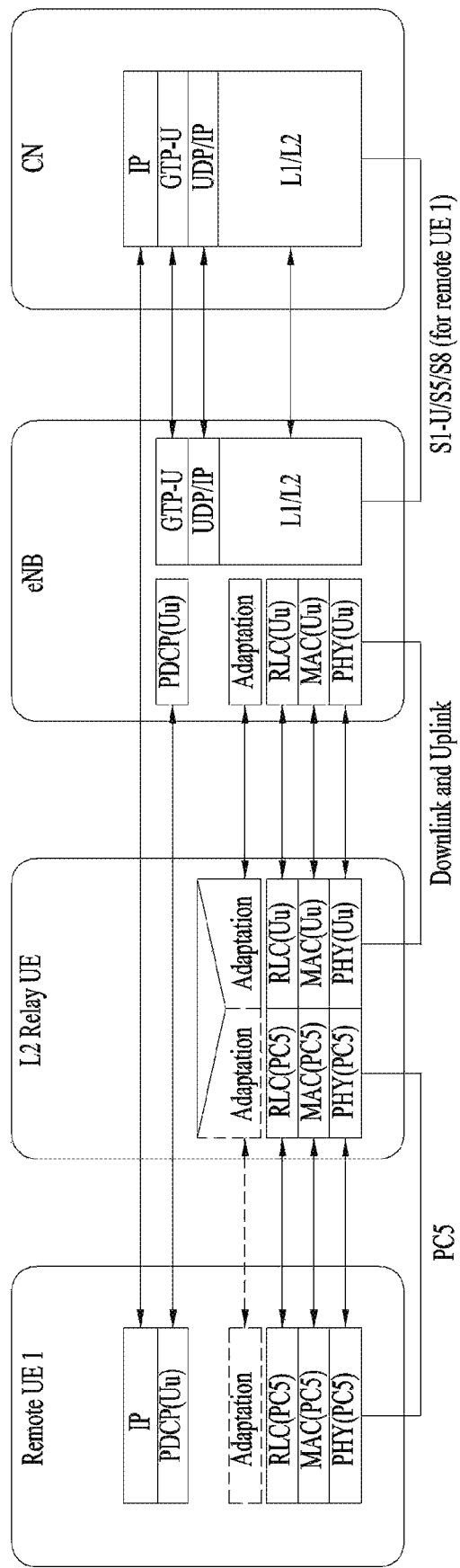
FIGS. 8a to 8d are examples for radio protocol stacks for Layer-2 evolved UE-to-Network relay.
Figure 8B:
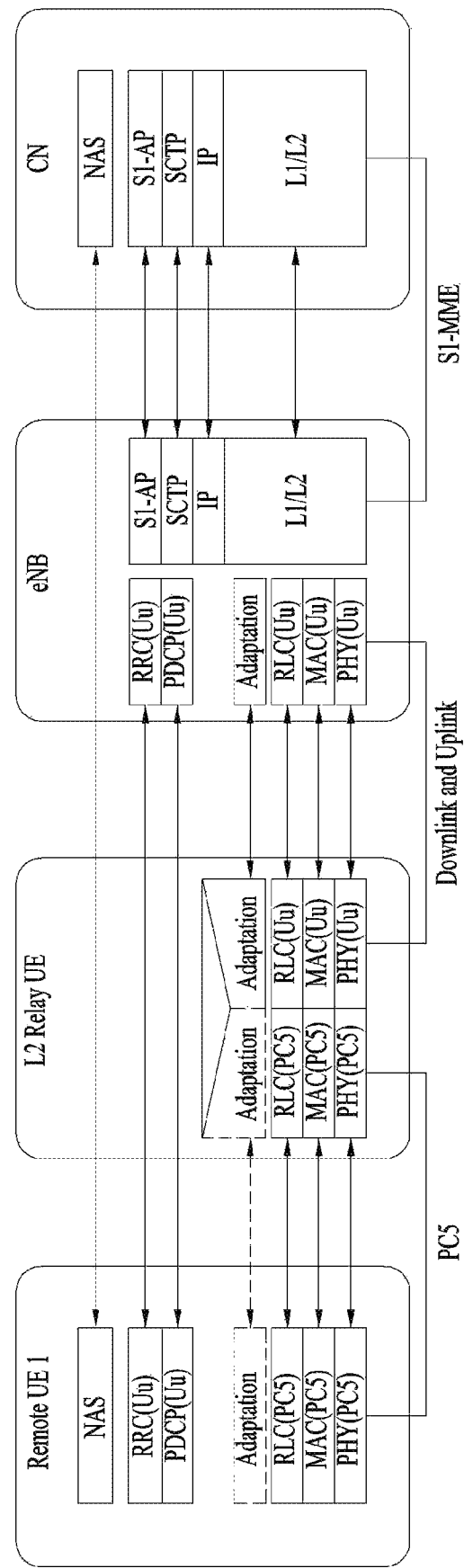
Figure 8C:
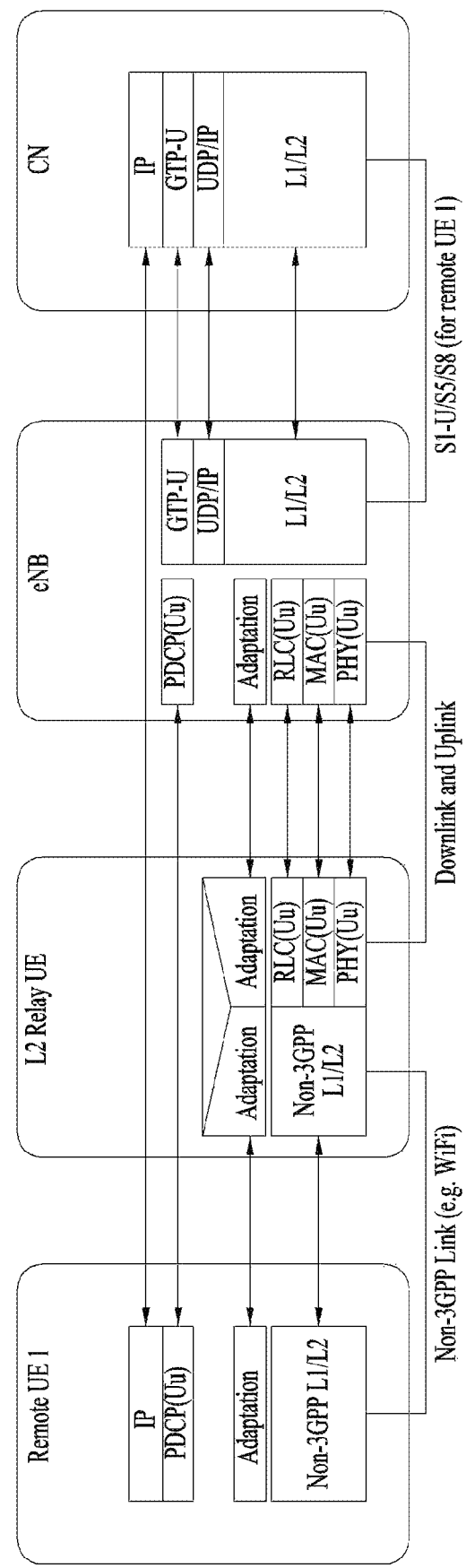
Figure 8D:
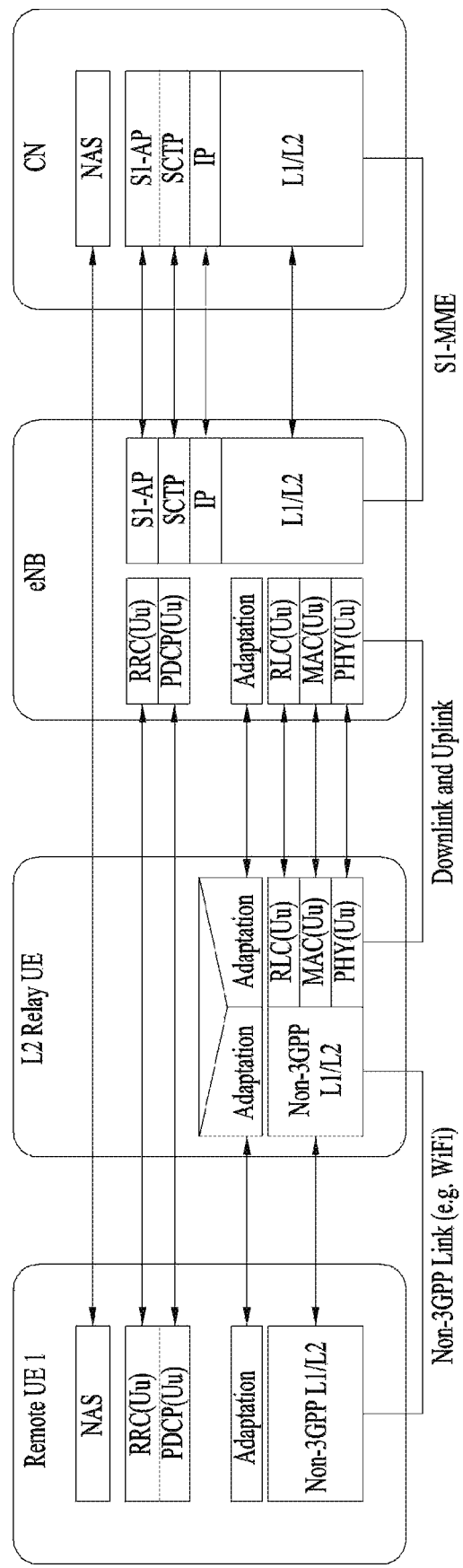

For protocol architecture for the user plane and control plane, relaying is performed above RLC sublayer. The evolved ProSe Remote UE's user plane and control plane data are relayed above RLC via the evolved ProSe UE-to-Network Relay UE from the evolved ProSe Remote UE to network and vice versa. Uu PDCP and RRC are terminated between the evolved ProSe Remote UE and the eNB while RLC, MAC and PHY and the non-3GPP transport layers are terminated in each link (i.e. the link between the evolved ProSe Remote UE and the evolved ProSe UE-to-Network Relay UE and the link between the evolved ProSe UE-to-Network Relay UE and the eNB). The user plane protocol stack and the control plane protocol stack when PC5 is used between the evolved ProSe remote UE and the evolved ProSe UE-to-Network Relay UE is shown in FIG. 8a and FIG. 8b. The user plane protocol stack and the control plane protocol stack when non-3GPP access is used between the evolved ProSe remote UE and the evolved ProSe UE-to-Network Relay UE is shown in FIG. 8c and FIG. 8d.

When PC5 interface is used between the evolved ProSe remote UE and the evolved ProSe UE-to-Network Relay UE, by introducing a relay UE for UE-to-network relay, a Remote UE transmits data to an eNB via the Relay UE, and the eNB transmits data to the Remote UE via the Relay UE. I.e., the Relay UE relays data to/from eNB.

As data transfer between the remote UE and the Relay UE is ProSe communication, the Relay UE is communicating with the Remote UE over PC5 interface. In the meantime, as data transfer between the Relay UE and the eNB is a normal uplink/downlink (Uu) communication, the Relay UE is communicating with the eNB over Uu interface.

A ProSe UE-to-Network Relay provides a generic L3 forwarding function that can relay any type of IP traffic between the Remote UE and the network. One-to-one and one-to-many sidelink communications are used between the Remote UE(s) and the ProSe UE-to-Network Relay. For both Remote UE and Relay UE only one single carrier (i.e., Public Safety ProSe Carrier) operation is supported (i.e., Uu and PC5 should be same carrier for Relay/Remote UE). The Remote UE is authorised by upper layers and can be in-coverage of the Public Safety ProSe Carrier or out-of-coverage on any supported carriers including Public Safety ProSe Carrier for UE-to-Network Relay discovery, (re) selection and communication. The ProSe UE-to-Network Relay is always in-coverage of EUTRAN. The ProSe UE-to-Network Relay and the Remote UE perform sidelink communication and sidelink discovery.

A ProSe UE-to-Network Relay performing sidelink communication for ProSe UE-to-Network Relay operation has to be in RRC_CONNECTED. After receiving a layer-2 link establishment request or TMGI monitoring request (upper layer message) from the Remote UE, the ProSe UE-to-Network Relay indicates to the eNB that it is a ProSe UE-to-Network Relay and intends to perform ProSe UE-to-Network Relay sidelink communication. The eNB may provide resources for ProSe UE-to-Network Relay communication.

The Remote UE can decide when to start monitoring for ProSe UE-to-Network Relay discovery. The Remote UE can transmit ProSe UE-to-Network Relay discovery solicitation messages while in RRC_IDLE or in RRC_CONNECTED depending on the configuration of resources for ProSe UE-to-Network Relay discovery. The eNB may broadcast a threshold, which is used by the Remote UE to determine if it can transmit ProSe UE-to-Network Relay discovery solicitation messages, to connect or communicate with ProSe UE-to-Network Relay UE. The RRC_CONNECTED Remote UE, uses the broadcasted threshold to determine if it can indicate to eNB that it is a Remote UE and wants to participate in ProSe UE-to-Network Relay discovery and/or communication. The eNB may provide, transmission resources using broadcast or dedicated signalling and reception resources using broadcast signalling for ProSe UE-to-Network Relay Operation. The Remote UE stops using ProSe UE-to-Network Relay discovery and communication resources when RSRP goes above the broadcasted threshold.

The Remote UE performs radio measurements at PC5 interface and uses them for ProSe UE-to-Network Relay selection and reselection along with higher layer criterion. A ProSe UE-to-Network Relay is considered suitable in terms of radio criteria if the PC5 link quality exceeds configured threshold (pre-configured or provided by eNB). The Remote UE selects the ProSe UE-to-Network Relay, which satisfies higher layer criterion and has best PC5 link quality among all suitable ProSe UE-to-Network Relays. Traffic of one or multiple evolved ProSe Remote UEs may be mapped to a single DRB of Uu interface of the evolved ProSe UE-to-Network Relay UE. Multiple Uu DRBs may be used to carry traffic of different QoS classes, for one or multiple evolved ProSe Remote UEs. It is also possible to multiplex traffic of evolved ProSe UE-to-Network Relay UE itself onto the Uu DRB, which is used to relay traffic to/from evolved ProSe Remote UEs. How the mapping of the traffic between sidelink bearers and Uu bearers is done is up to the eNB implementation and the mapping is configured in evolved ProSe UE-to-Network Relay UE by the eNB. An adaptation layer over Uu is supported to identify the evolved ProSe Remote UE/evolved ProSe UE-to-Network Relay UE and the corresponding.

Traffic of one or multiple evolved ProSe Remote UEs may be mapped to a single DRB of Uu interface of the evolved ProSe UE-to-Network Relay UE. Multiple Uu DRBs may be used to carry traffic of different QoS classes, for one or multiple evolved ProSe Remote UEs. It is also possible to multiplex traffic of evolved ProSe UE-to-Network Relay UE itself onto the Uu DRB, which is used to relay traffic to/from evolved ProSe Remote UEs. How the mapping of the traffic between sidelink bearers and Uu bearers is done is up to the eNB implementation and the mapping is configured in evolved ProSe UE-to-Network Relay UE by the eNB. An adaptation layer over Uu is supported to identify the evolved ProSe Remote UE/evolved ProSe UE-to-Network Relay UE and the corresponding.

Figure 9:
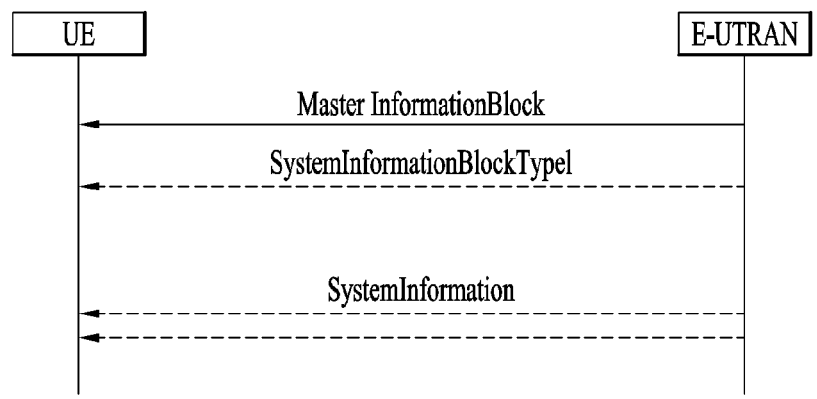
FIG. 9 is a diagram for system information acquisition by a UE.

FIG. 9 is a diagram for system information acquisition by a UE.

System information is divided into the MasterInformationBlock (MIB) and a number of SystemInformationBlocks (SIBs). The MIB includes a limited number of most essential and most frequently transmitted parameters that are needed to acquire other information from the cell, and is transmitted on BCH. SIBs other than SystemInformationBlockType1 are carried in SystemInformation (SI) messages and mapping of SIBs to SI messages is flexibly configurable by schedulingInfoList included in SystemInformationBlockType1, with restrictions that: each SIB is contained only in a single SI message, and at most once in that message; only SIBs having the same scheduling requirement (periodicity) can be mapped to the same SI message; SystemInformationBlockType2 is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH.

The Bandwidth reduced Low Complexity (BL) UEs and UEs in Coverage Enhancement (CE) apply Bandwidth Reduced (BR) version of the SIB or SI messages. A UE considers itself in enhanced coverage as specified in TS 36.304. In this and subsequent clauses, anything applicable for a particular SIB or SI message equally applies to the corresponding BR version unless explicitly stated otherwise.

For NB-IoT, a reduced set of system information block with similar functionality but different content is defined; the UE applies the NB-IoT (NB) version of the MIB and the SIBs. These are denoted MasterInformationBlock-NB and SystemInformationBlockTypeX-NB in this specification. All other system information blocks (without NB suffix) are not applicable to NB-IoT; this is not further stated in the corresponding text.

In addition to broadcasting, E-UTRAN may provide SystemInformationBlockType1 and/or SystemInformationBlockType2, including the same parameter values, via dedicated signalling i.e., within an RRCConnectionReconfiguration message.

The UE applies the system information acquisition and change monitoring procedures for the PCell, except when being a BL UE or a UE in CE or a NB-IoT UE in RRC_CONNECTED mode while T311 is not running. For an SCell, E-UTRAN provides, via dedicated signalling, all system information relevant for operation in RRC_CONNECTED when adding the SCell. However, a UE that is configured with DC shall aquire the MasterInformationBlock of the PSCell but use it only to determine the SFN timing of the SCG, which may be different from the MCG. Upon change of the relevant system information of a configured SCell, E-UTRAN releases and subsequently adds the concerned SCell, which may be done with a single RRCConnectionReconfiguration message. If the UE is receiving or interested to receive an MBMS service in a cell, the UE shall apply the system information acquisition and change monitoring procedure to acquire parameters relevant for MBMS operation and apply the parameters acquired from system information only for MBMS operation for this cell.

In MBMS-dedicated cell, non-MBSFN subframes are used for providing MasterInformationBlock-MBMS (MIB-MBMS) and SystemInformationBlockType1-MBMS. SIBs other than SystemInformationBlockType1-MBMS are carried in SystemInformation-MBMS message which is also provided on non-MBSFN subframes.

The UE shall apply the system information acquisition procedure upon selecting (e.g. upon power on) and upon re-selecting a cell, after handover completion, after entering E-UTRA from another RAT, upon return from out of coverage, upon receiving a notification that the system information has changed, upon receiving an indication about the presence of an ETWS notification, upon receiving an indication about the presence of a CMAS notification, upon receiving a notification that the EAB parameters have changed, upon receiving a request from CDMA2000 upper layers and upon exceeding the maximum validity duration. Unless explicitly stated otherwise in the procedural specification, the system information acquisition procedure overwrites any stored system information, i.e. delta configuration is not applicable for system information and the UE discontinues using a field if it is absent in system information unless explicitly specified otherwise The MIB is mapped on the BCCH and carried on BCH while all other SI messages are mapped on the BCCH and BR-BCCH, and carried on DL-SCH. Except for BL UEs, UEs in enhanced coverage and NB-IoT UEs, all other SI messages than the MIB which are dynamically carried on DL-SCH, can be identified through the SI-RNTI (System Information RNTI). Both the MIB and SystemInformationBlockType1 (SystemInformationBlockType1-BR for BL UEs and UEs in enhanced coverage) use a fixed schedule with a periodicity of 40 ms and 80 ms respectively. The scheduling of other SI messages is flexible and indicated by SystemInformationBlockType1 (SystemInformationBlockType1-BR for BL UEs and UEs in enhanced coverage, and SystemInformationBlockType1-NB for NB-IoT). For NB-IoT, the MIB-NB is mapped on the BCCH and carried on BCH while all other SI messages are mapped on the BCCH and carried on DL-SCH. Both the MIB-NB and SystemInformationBlockType1-NB use a fixed schedule with a periodicity of 640 and 2560 ms respectively. The MIB-NB contains all information required to acquire SIB1-NB and SIB1-NB contains all information required to acquire other SI messages.

On MBMS-dedicated cell, the MIB-MBMS and SIB1-MBMS use a fixed schedule with a periodicity of 160 ms. Additionally, SIB1-MBMS may be scheduled in additional non-MBSFN subframes indicated in MIB-MBMS.

Except for NB-IoT, the eNB may schedule DL-SCH transmissions concerning logical channels other than BCCH or BR-BCCH in the same subframe as used for BCCH or BR-BCCH. The minimum UE capability restricts the BCCH or BR-BCCH mapped to DL-SCH e.g. regarding the maximum rate.

The Paging message is used to inform UEs in RRC_IDLE and UEs in RRC_CONNECTED about a system information change. For NB-IoT, the UE is not required to detect SIB changes when in RRC_CONNECTED, and the network may release the NB-IoT UE to RRC_IDLE if it wants the NB-IoT UE to acquire changed SIB(s).

Except for NB-IoT, system information may also be provided to the UE by means of dedicated signalling e.g. upon handover.

In the case of a legacy relay, though the remote UE is dependent on the relay UE, control of the remote UE in a cell was performed with the SIB of the cell. If the remote UE is located outside of the cell coverage, the remote UE behaves according to the preconfigured configuration. The relay UE was controlled by a SIB of the cell which the relay UE is served. In other words, there was no need to send SIB to the remote UE. However, as described above, since the introduction of layer 2 relay UE, the remote UE is required to establish RRC connection with the eNB even if the remote UE connects to the eNB through the relay UE in order to communicate with the eNB. Under this situation, it is desirable for the remote UE to be controlled by the eNB to which the remote UE is connected. The relay UE can be in cell different from the one of the remote UE. Then, the system information of each cell is different. However, if the remote UE is linked to the relay UE, it is desirable for the remote UE to behave according to the system information of the cell of the relay UE. However, if the remote UE already has the same SIB as SIB for the relay UE, the relay UE does not need to forward the SIB to the remote UE. Thus, if the relay UE sends SIB to the remote UE whenever the remote UE establishes a link with the relay UE, it is not good for saving battery consumption and improving the efficiency of radio resource for sidelink communication.

Meanwhile, the UE selectively receives only the SIBs belong to the required SIBs of the UE other than the MIB and the SIB1. Thus, when the relay UE wants to relay data between a remote UE and a network, the relay UE may need to additionally receive the SIB belongs to the required SIB of the linked remote UE. For example, if the relay UE is not NB-IOT/BL UE or in CE, the relay UE is not necessary to receive the SIBs associated with NB-IOT/BL/CE. However, in case there are NB-IOT/MTC remote UEs or remote UE are in enhanced coverage, the relay UE is required to receive the relevant SIBs even though those SIBs are not necessary for operation of relay UE itself.

Therefore, the present invention proposes to forward SIB, by the relay UE, to reduce battery consumption and improve the efficiency of radio resource for sidelink communication.

Further, the present invention proposes to receive, by the relay UE, a required SIB of a remote UE as its required SIB, after linking between the remote UE and the relay UE.

Figure 10:
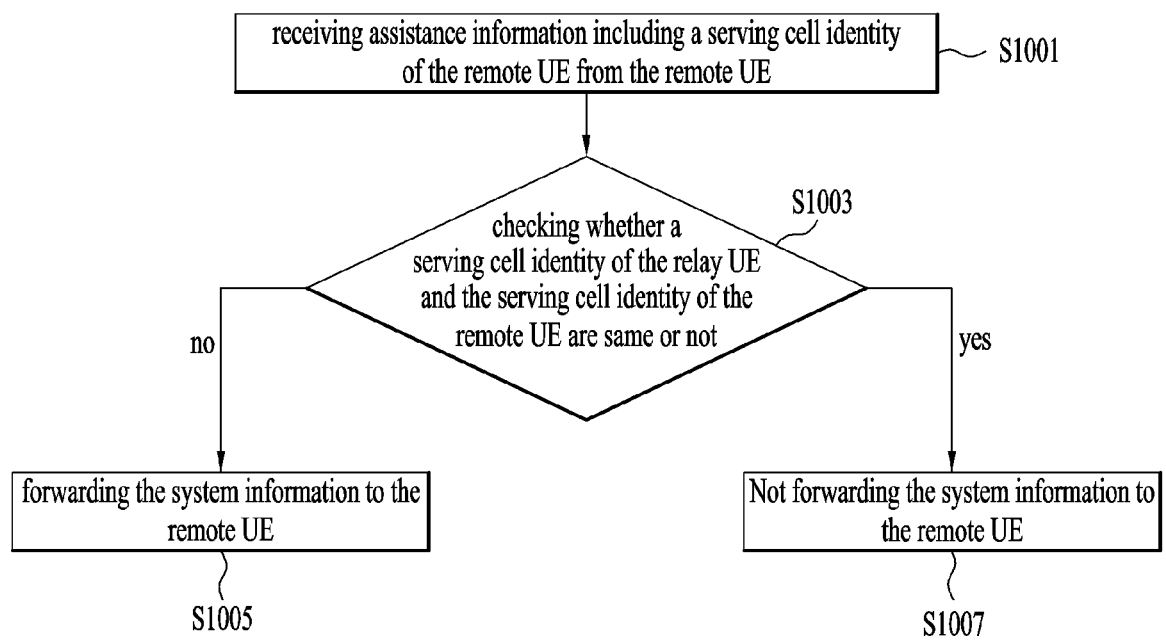
FIG. 10 is a conceptual diagram for forwarding system information for a remote UE by a relay UE in wireless communication system according to embodiments of the present invention.

FIG. 10 is a conceptual diagram for forwarding system information for a remote UE by a relay UE in wireless communication system according to embodiments of the present invention.

The method comprises of relay UE receiving an assistance information including serving cell identity of the remote UE from the remote UE and forwarding the system information if the serving cell identity of the relay UE and the serving cell identity of the remote UE is different.

More specifically, the relay UE receives assistance information from the remote UE (S1001) during discovery procedure, establishing connection (linking) between the remote UE and the relay UE or right after establishing connection (linking).

Preferably, when the remote UE which wants to communicate between the remote UE and the network via the relay UE, the remote UE tries to establish a link between a remote UE and the relay UE, and then the remote UE provides the assistance information to the relay UE.

Preferably, the relay UE optionally requests the assistance information when the remote UE establishes connection (linking) to the relay UE.

Preferably, the assistance information includes one or more a serving cell identity of the remote UE, UE type, or required system information.

In case of a serving cell identity of the remote UE, the remote UE may send the serving cell identity (e.g. PCI or ECGI) to the linked relay UE. The serving cell of the remote UE is the cell the remote UE has been camped on before linking to the relay UE. If the remote UE is linked to another relay UE, the serving cell of the remote UE is the serving cell of the relay UE.

The remote UE may send the UE type (e.g. UE category (e.g. NB-IOT, Cat.M1, Cat.0)) and/or required system information to the relay UE. The remote UE additionally sends the relay UE a coverage information. The coverage information includes whether the UE is in enhanced coverage or not.

Further, the remote UE may send common value tag information for all SIB or value tag information for each SIB for required SIB, and the remote UE may send RRC state of the remote UE itself to the relay UE.

Upon receiving the above assistance information from the remote UE, the relay UE determines whether to forward system information block (SIB) as described below (S1003).

If the serving cell identity of the relay UE and the serving cell identity of the remote UE is different, the relay UE forwards the system information to the remote UE (S1005).

Preferably, the serving cell identity of the relay UE is acquired by the relay UE when the relay UE connects to the cell or camps on the cell, and the serving cell identity of the remote UE is acquired when the remote UE has been camped or connected to the cell before linking to the relay UE.

For example, if information regarding system information requested/required by the remote UE is present in the assistance information, the relay UE forwards the up-to-date requested system information.

If information regarding requested/required system information is not present and RRC state of the remote UE is present in the assistance information, the relay UE forwards the required SIB corresponding to the RRC state to the remote UE.

If UE type and/or coverage information is present in the assistance information, the relay UE forwards the required SIB corresponding to the UE type and/or coverage information.

If only serving cell identity information is present and received serving cell information of the remote UE is different from the serving cell identity of the relay UE, the relay UE forwards the all the received system information.

Meanwhile, if the serving cell identity of the relay UE and the serving cell identity of the remote UE are same, the relay UE does not send the system information (S1007).

However, if the received value tag information from the remote UE is different from the value tag information of the relay UE although the serving cell identity of the relay UE and the serving cell identity of the remote UE are same, the relay UE provides the all the system information or the required SIB to the remote UE.

Indeed, if the received value tag information of a certain SIB from the remote UE is different from the value tag information of the certain SIB of the relay UE, although the serving cell identity of the relay UE and the serving cell identity of the remote UE are same, the relay UE provides the concerned SIB to the remote UE.

After linking between the remote UE and the relay UE, if a certain SIB does not belong to the required SIB of the relay UE and the SIB belongs to the required SIB of the linked remote UE, the relay UE considers the SIB as required SIB of relay UE itself and ensures having a valid version of the SIB. For example, if the relay UE does not have SIB regarding NB-IOT/MTC/Coverage enhancement and the remote UE requires those SIB. Before forwarding the system information, if the relay UE is required to receive SIB additionally (e.g. does not have valid version of required SIB), the relay UE reads the concerned SIB.

However, the link between relay UE and remote UE is released, the relay UE does not consider the SIB, which does not belong to required SIB of the relay UE but belongs to required SIB of the linked remote UE, as the required SIB of the relay UE, and the relay UE does not receive the required SIB of the remote UE as the required SIB of the relay UE itself.

Figure 11:
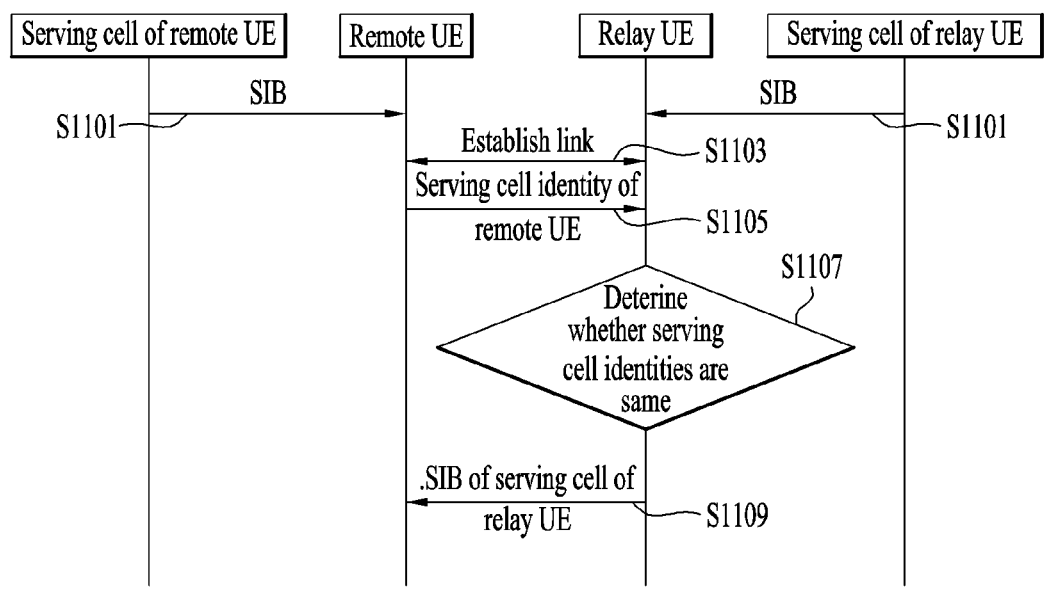
FIGS. 11 and 12 are examples for forwarding system information for a remote UE by a relay UE in wireless communication system according to embodiments of the present invention.

FIG. 11 is an example for forwarding system information for a remote UE by a relay UE in wireless communication system according to embodiments of the present invention.

In this example, it is assumed that the serving cell of the remote UE and serving cell of the relay UE is different before establishing link. Before establishing link, each UE receives the SIB from each serving cell (S1101).

The remote UE discovers the relay UE and established the link with the discovered relay UE (S1103).

The remote UE provides the serving cell identity of the remote UE to the relay UE (S1105).

The relay UE determines whether the serving cell of the remote UE is same as the serving cell of relay UE itself (S1107).

If the serving cell identities are different, the relay UE provides SIB of the serving cell of the relay UE (S1009).

Figure 12:
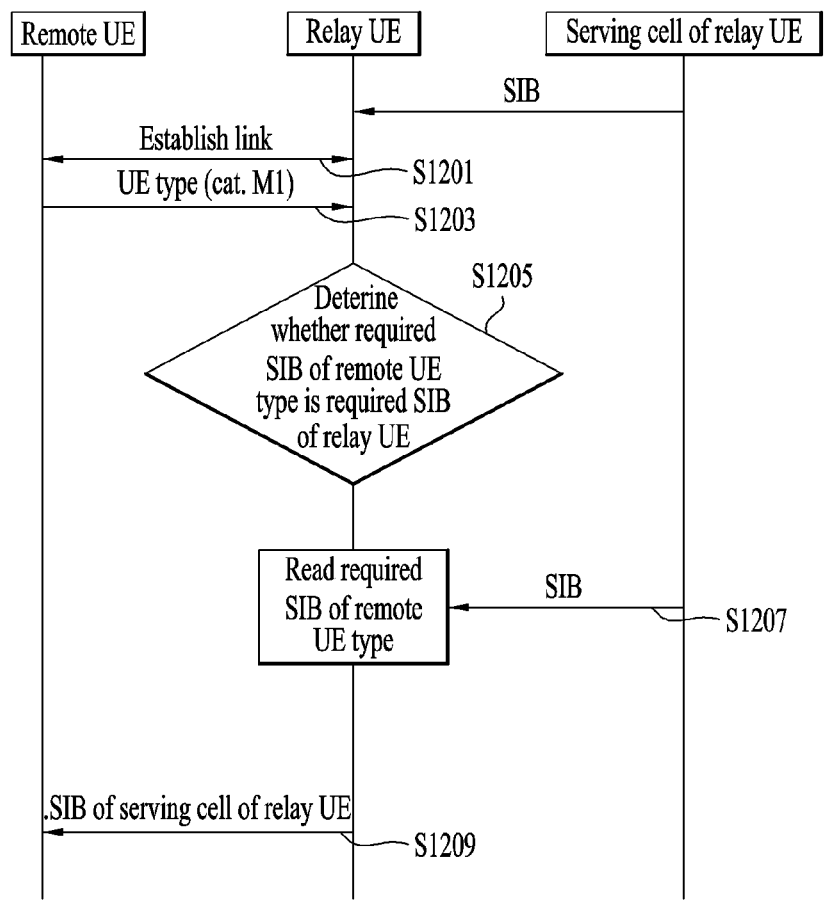

FIG. 12 is another example for forwarding system information for a remote UE by a relay UE in wireless communication system according to embodiments of the present invention.

In this example, it is assumed that relay UE is normal UE (e.g. Cat. 6, non-bandwidth limited (BL) UE) and the remote UE is Cat. M1 (BL) UE.

The remote UE discovers the relay UE and established the link with the discovered relay UE (S1201). The remote UE provides UE type (e.g. UE category) information to the linked relay UE (S1203).

The relay UE determines whether required SIB of the remote UE type is the required SIB of the relay UE. In other words, the relay UE determines whether the required SIB of the remote UE type is stored in the relay UE (S1205).

If a certain SIB does not belong to the required SIB of the relay UE and the SIB belongs to the required SIB of the linked remote UE, the relay UE considers the SIB as required SIB and ensures having a valid version of the SIB. The relay UE receives the concerned SIB additionally (S1207).

The relay UE provides the required SIB of the remote UE type to the remote UE (S1209).

Figure 13:
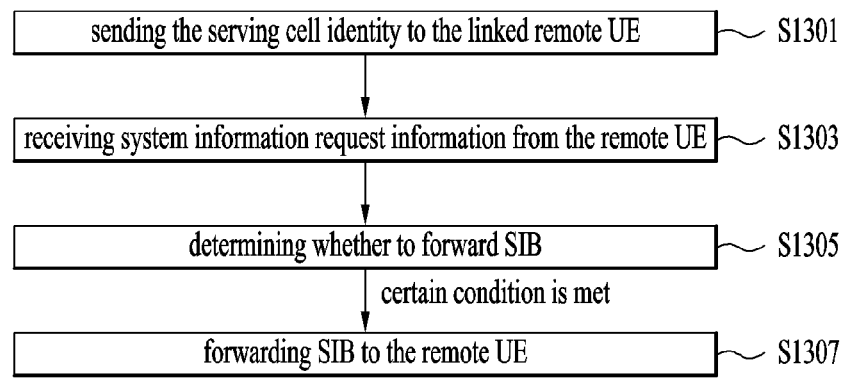
FIG. 13 is a conceptual diagram for forwarding system information for a remote UE by a relay UE in wireless communication system according to embodiments of the present invention.

FIG. 13 is a conceptual diagram for forwarding system information for a remote UE by a relay UE in wireless communication system according to embodiments of the present invention.

The method comprises of remote UE optionally requesting serving cell identity information, receiving the serving cell identity of the relay UE and requesting the system information if the serving cell identity of the relay UE and the serving cell identity of the remote UE are different.

The relay UE sends the serving cell identity (e.g. PCI or ECGI) to the linked remote UE (S1301). The information is provided during discovery procedure, establishing connection (linking) between the remote UE and the relay UE or right after establishing connection (linking).

The relay UE receives the system information request information from the remote UE during establishing connection (linking) between the remote UE and the relay UE or right after establishing connection (linking) (S1303).

Preferably, the request information includes one or more UE type, required system information.

For example, the remote UE may send the UE type (e.g. UE category (e.g. NB-IOT, Cat.M1, Cat.0)) and/or required system information. The remote UE additionally sends the to the UE a coverage information. The coverage information includes whether the UE is in enhanced coverage or not.

The remote UE may send common value tag information for all SIB or value tag information for each SIB for required SIB. Or the remote UE may send RRC state to the relay UE.

Preferably, indication showing whether up-to-date system information is necessary.

Upon receiving the above assistance information from the remote UE, the relay UE determines whether to forward SIB as described below (S1305). And if a certain condition is met, the relay UE forwards SIB to remote UE (S1307).

If requested system information is present in the assistance information, the relay UE forwards the up-to-date requested system information.

If requested system information is not present but information on RRC state of the remote UE is present in the assistance information, the relay UE forwards the required SIB corresponding to the RRC state to the remote UE.

If UE type and/or coverage information is present in the assistance information, the relay UE forwards the required SIB corresponding to the UE type and/or coverage information.

If indication showing whether up-to-date system information is present, the relay UE forwards all the received system information.

If a certain SIB does not belong to the required SIB of the relay UE and the SIB belongs to the required SIB of the linked remote UE, the relay UE considers the SIB as required SIB of relay UE itself and ensures having a valid version of the SIB. For example, if the relay UE does not have SIB regarding NB-IOT/MTC/Coverage enhancement and the remote UE requires those SIB, the relay UE considers those SIB as required SIB and reads the concerned SIB. Before forwarding the system information, if the relay UE is required to receive SIB additionally (e.g. does not have valid version of required SIB), the relay UE reads the concerned SIB.

If the link between the remote UE and the relay UE is released, the relay UE does not considered the required SIB of the remote UE as the required SIB of the relay UE itself.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE or NR system, the present invention is applicable to a variety of wireless communication systems in addition to the 3GPP LTE or NR system.

The invention claimed is:

1. A method for a relay user equipment (UE) operating in a wireless communication system, the method comprising:
receiving a discovery signal from a remote UE;
establishing, by the relay UE, a link with the remote UE for communicating between the remote UE and a network via the relay UE, based on the discovery signal;
receiving, by the relay UE, a system information block (SIB) from the network;
receiving, by the relay UE, assistance information including at least one of UE type information and coverage information; and
forwarding, by the relay UE, a required system information block (SIB) corresponding to the received at least one of UE type information and coverage information based on the SIB received from the network,
wherein based on the assistance information further including an SIB requested from the remote UE, the relay UE forwards an up-to-date requested SIB, and
wherein based on the assistance information not including the requested SIB and including information about a radio resource control (RRC) state of the remote UE, the relay UE forwards a required SIB corresponding to the RRC state to the remote UE.

2. A relay user equipment (UE) configured to operate in a wireless communication system, the UE comprising:
a transceiver; and
a processor operably coupled with the transceiver and configured to:
receive a discovery signal from a remote UE,
establish a link with the remote UE for communicating between the remote UE and a network via the relay UE, based on the discovery signal,
receive a system information block (SIB) from the network,
receive assistance information including at least one of UE type information and coverage information, and
forward a required system information block (SIB) corresponding to the received UE type information or coverage information based on the SIB received from the network,
wherein based on the assistance information further including an SIB requested from the remote UE, the relay UE forwards an up-to-date requested SIB, and
wherein based on the assistance information not including the requested SIB and including information about a radio resource control (RRC) state of the remote UE, the relay UE forwards a required SIB corresponding to the RRC state to the remote UE.

3. The UE according to claim 2, wherein the UE is capable of communicating with at least one of another UE, a UE related to an autonomous driving vehicle, a base station or a network.

* * * * *